United States Patent [19]

Nelson

[11] 3,732,563
[45] May 8, 1973

[54] PULSE TRAIN DECODER-DEGARBLER

[75] Inventor: George P. Nelson, Oxon Hill, Md.

[73] Assignee: The United States of America as represented by the Secretary of the Navy, Washington, D.C.

[22] Filed: July 12, 1971

[21] Appl. No.: 161,672

[52] U.S. Cl. ............................................. 343/6.5 LC
[51] Int. Cl. ............................. G01s 7/28, G01s 9/56
[58] Field of Search ...................... 343/6.5 R, 6.5 LC

[56] References Cited

UNITED STATES PATENTS 3,188,629   6/1965   Humpherys ...................... 343/6.5 LC

*Primary Examiner*—T. H. Tubbesing
*Attorney*—R. S. Sciascia et al.

[57] ABSTRACT

A decoder-degarbler for increasing the decoding efficiency of IFF decoders in the presence of garbled signals. Three delay lines and logic circuitry are utilized to detect the presence of a garble condition and bracket decode condition. A coincidence means then determines if an established decoding criteria has been met whereby there is a degarbled bracket decode output to permit decoding of the pulse train data input.

8 Claims, 5 Drawing Figures

INVENTOR
GEORGE P. NELSON
ATTORNEYS

PULSE TRAIN DECODER-DEGARBLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The military Identification Friend-Foe (IFF) system and the civilian Air Traffic Control Radar Beacon System (ATCRBS) transponder reply signal consists of radio frequency energy which has been pulse modulated according to a specific format. The signal consists of up to fifteen individual pulses of 0.45 microsecond nominal pulse width, spaced in 1.45 microsecond multiples. The first and last pulses, separated by 20.3 microseconds, are always present and are called the framing pulses. The remainder of the pulse positions contain the information pulses, which may or may not be present, depending upon the code being transmitted. The coding of the signal is the presence or absence of any one, or combination, of the thirteen information pulses. The purposes of a decoder is to either determine the code being transmitted, or to act as a filter, allowing only selected codes to be passed through.

A form of interference is present within the system which is called a garble or garbling. A true garble is caused by the time overlapping of two information pulse trains with similar characteristics, i.e., the presence of the two framing pulses. The time relationship between the two pulses trains is such that pulses from the second train are present within, or close to, the correct time slots for information pulses of the first pulse train. The result is that this type of garble can be, and often is, an incorrect decode of the pulse train.

Given two individual pulse trains which are overlapped, a time movement of one pulse train with respect to the other of 1.45 microseconds will create a garble condition during some portion of the time due to the 1.45 microsecond spacing of the information pulse positions. Decoding efficiency is defined as a ratio of time during which correct decoding takes place to total time movement of one train with respect to the other. Thus, if during a 1.45 microsecond movement between two pulse trains, the time during which decoding takes place is 0.35 microseconds, the decoding efficiency is 0.24 or 24 percent.

A performance limitation of present techniques is that the decoding efficiency obtained is a function of the input pulse width. The performance tolerances within the IFF/ATCRBS system allow for a variation in input pulse width of between 0.35 to 0.55 microseconds. Additionally, present techniques do not allow for the proper decoding of signals in which pulses from the two interfering trains have become combined to form a single long pulse rather than two distinct pulses of proper width. These two previous limitations on the decoding process serve to limit the maximum decoding efficiency that can be obtained to 24 percent, with 0.45 microsecond input pulse widths.

Methods of detecting the presence of a garble condition and using the detected garble to inhibit any decode are well known and have been employed by equipment used in the IFF/ATCRBS radar beacon system. One such circuit is disclosed in U.S. Pat. No. 3,188,624 to B.H. Humphreys. Tests of representative decoding equipments have shown such garble detection and decode-inhibiting circuitry to be efficient in the prevention of incorrect decodes. However, the same tests showed decoding efficiency, obtaining correct decodes under garble conditions, was extremely low.

SUMMARY OF THE INVENTION

The present invention overcomes the disadvantages of the prior art by establishing decoding criteria whereby an IFF signal may be decoded whenever a ungarbled condition exists. Delay lines having their taps coupled to logical gates are used to indicate garble clear zones and a decode zone at which time proper pulse train decoding may be made.

OBJECTS OF THE INVENTION

It is therefore an object of the present invention to provide an improved degarbler.

A further object of the present invention is to provide rapid identification of high speed aircraft, and of aircraft in areas of high aircraft density.

Yet another object of the present invention is to improve decoding efficiency in the presence of garbles.

A still further object of the present invention is to provide constant decoding efficiency regardless of input pulse widths.

A further object of the present invention is to provide for proper and accurate decoding of two overlapped pulse trains.

Yet another object of the present invention is to provide an IFF degarbler capable of separating signals from multiple sources.

A still further object of the present invention is to provide an IFF decoder capable of decoding transponder reply signals in the presence of other signals acting as interference.

These and further objects of the present invention will become more appreciated by reference to the following detailed description when considered in connection with the accompanying drawings wherein.

DESCRIPTION OF THE PREFERRED EMBODIMENT

Figure 3:
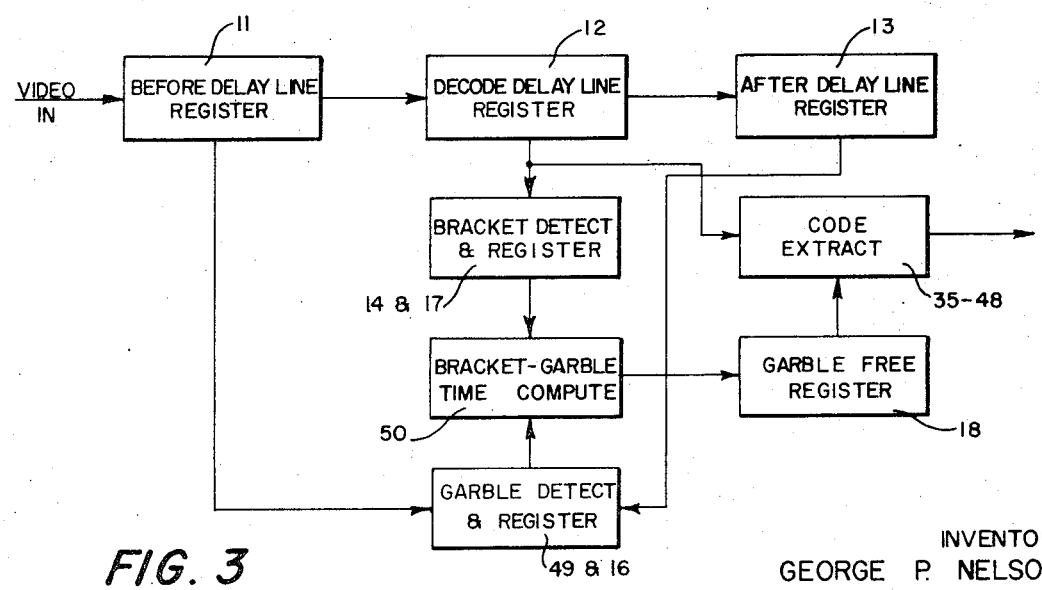
FIG. 3 illustrates a simplified block diagram of the decoder-degarbler.
Figure 4A:
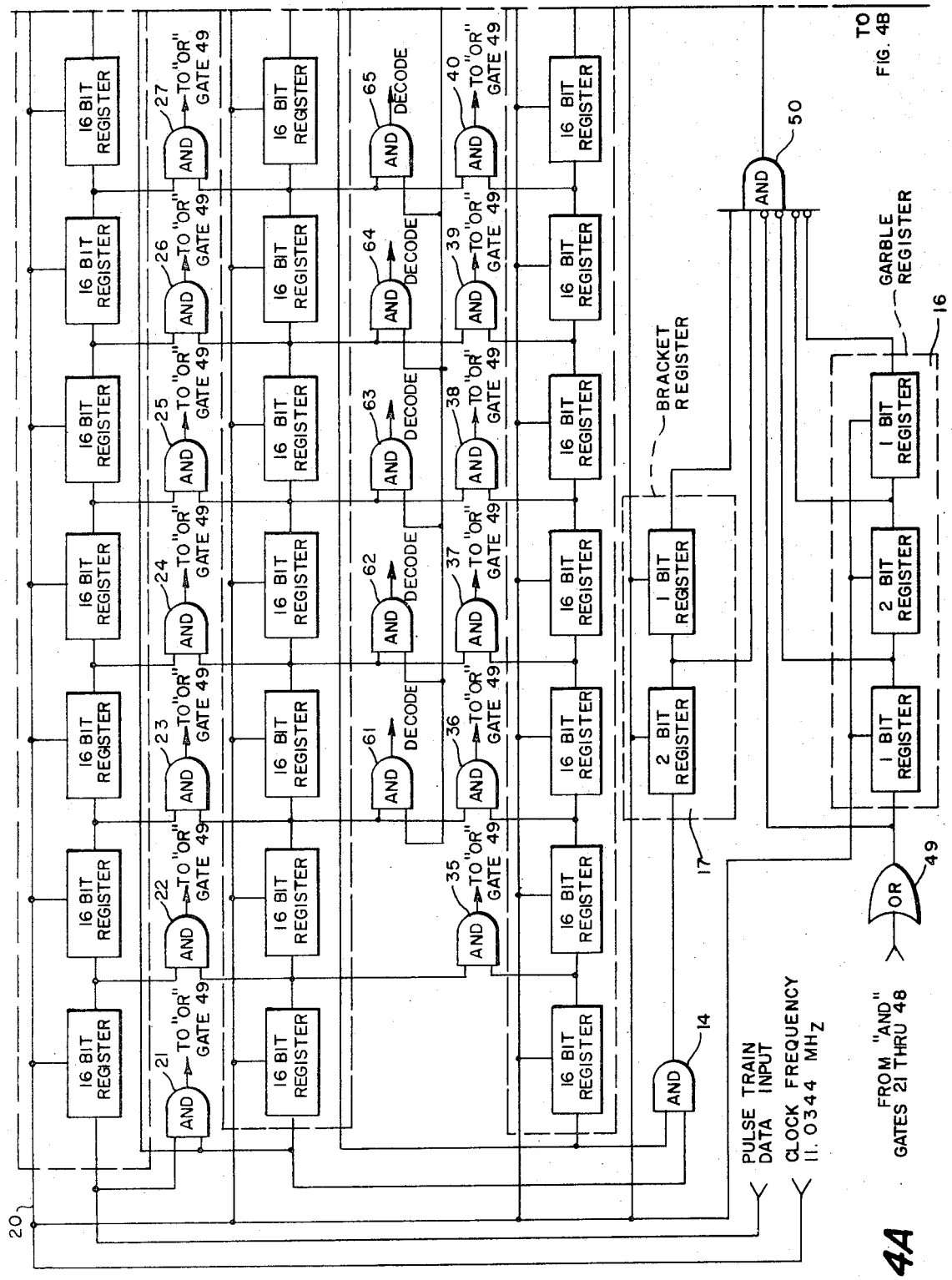
FIGS. 4a and 4b illustrate an overall block diagram of the decoder-degarbler.
Figure 4B:
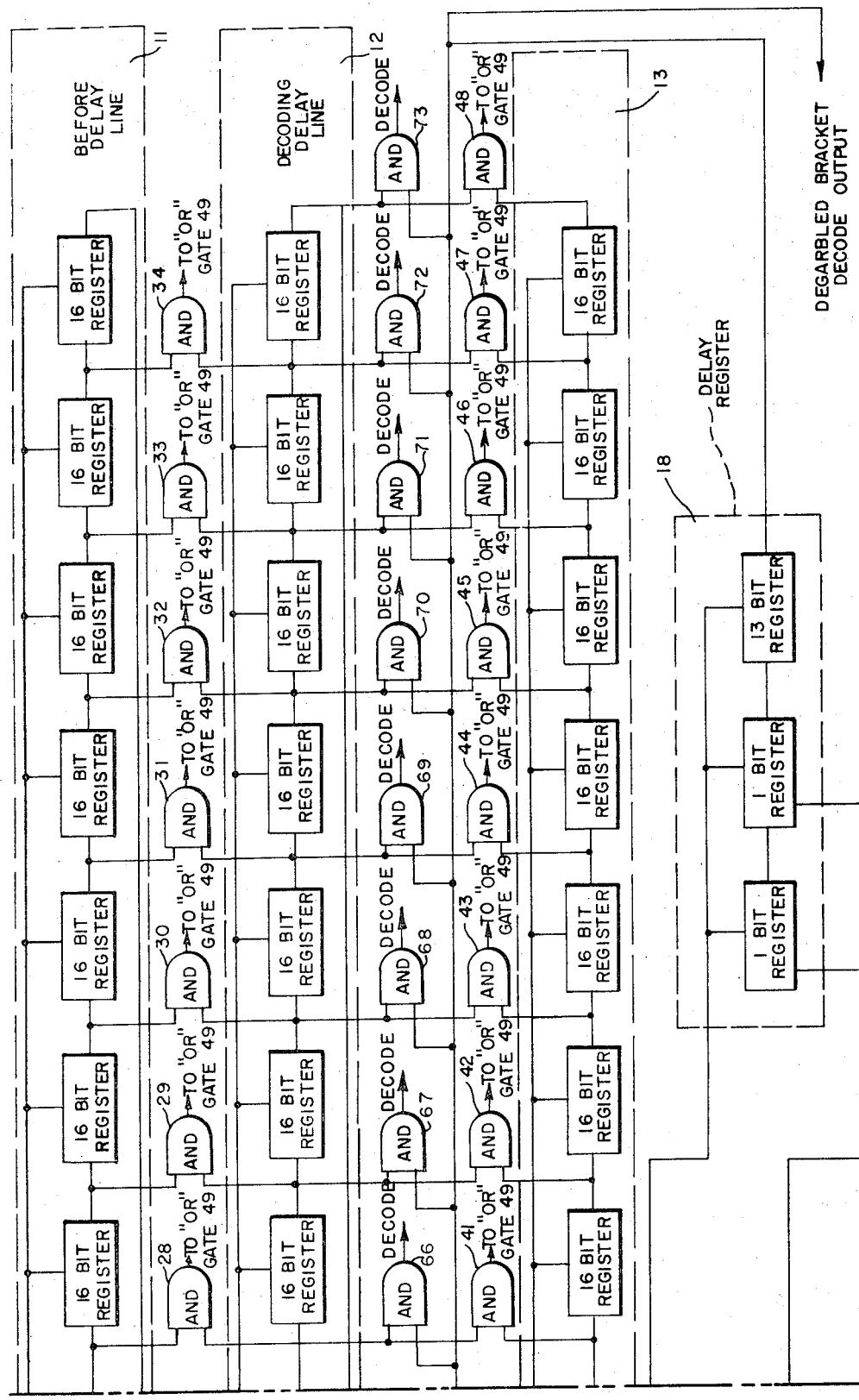

FIGS. 3 and 4a and 4b show a logic diagram for electronic circuitry constructed to perform the adaptive decoding. As with most decoders, the heart of the process involves the use of delay lines, both for determining the actual code present by checking for the simultaneous presence of information at various points along the delay line, and for the detection of a garble either before, after, or during the decode time. The circuitry contains three delay lines 11–13 of 20.3 microsecond length, the time delay within each line being equal to the spacing of the framing pulse within the IFF/ATCRBS reply pulse train. The delay lines have been labeled the Before Delay Line 11, the Decoding Delay line 12, and the After Delay Line 13.

The delay lines used in the preferred embodiment comprise multiple shift-register stages, in which the data is shifted from one stage to the next by the application of a pulse on the clock input line 20. The use of multiple pulses on the clock input to the shift register occurring at a constant high frequency so that the period between clock pulses is small compared to parameters of the input data, permits the data to be shifted smoothly through the entire shift register chain, while maintaining accurate pulse width information regardless of the time duration of delay. The circuitry shown in FIGS. 4a and 4b uses individual shift register stages for each 1.45 microsecond increment of delay, corresponding to the nominal information pulse spacing of the pulse train being decoded. The use of 16 stages per 1.45 microsecond time increment determines the clock frequency of 11.0344 MHz.

The middle of the three delay lines, the Decoding Delay Line 12, is used as the primary decoding element within the circuit. The decoding process is initiated by determining the presence of framing pulses in the IFF/ATCRBS reply pulse train. Since the Decoding Delay Line 12 is exactly 20.3 microseconds long, determined by the number of shift register stages and the clock frequency, the first framing pulse of a valid train will appear at the delay line 12 output simultaneously with the second framing pulse at the delay line 12 input. The detection of framing pulse coincidence is called bracket decoding, and is performed in the circuitry of FIG. 4a with AND gate 14.

A possible garble condition exists when two otherwise valid pulse trains are overlapped in time. For a garble condition to exist, it is necessary that an additional bracket decode be present within 20.3 microseconds of the bracket decode detected by AND gate 14. The purpose of the Before and After Delay Lines 11 and 13 is to detect other bracket decodes resulting from a garble before and after the normal bracket decode is decoded and detected by AND gate 14. The detection of the other bracket decodes from a garble is performed by AND gates 21 through 48. Each of the three delay lines 11, 12, 13 have an output every 1.45 microsecond time interval. The use of the multiple AND gates permits checking for extra bracket decodes from a garble at each of the Decoding Delay Line 12 information pulse output positions. The outputs of the multiple AND gates 21 through 48, are fed to a multiple input OR gate 49. The output of OR gate 49 is the garble detection signal. An output from OR gate 49 at the same time as a bracket decode from the AND gate 14 occurs means that two overlapping pulse trains have been detected and are garbled with respect to each other.

Figure 1:
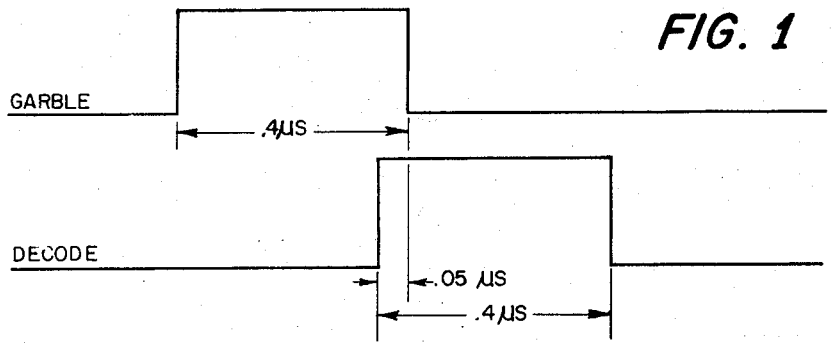
FIG. 1 illustrates the overlapping of a garble pulse and a decode pulse.

The primary improvement to the decoding process made by this invention is recognizing the decode versus garble situation with respect to time, and adapting the actual decode output to that situation. A typical case is shown in FIG. 1. Both a garble pulse, from the decoder's garble detection circuits 44, and a decode pulse, such as might be produced by normal techniques without the application of degarbling, are present. Each of the two pulses are 0.4 microseconds in width, with an overlap of 0.05 microseconds between them, giving 0.35 microseconds of effectively ungarbled decode. Intuitively, one knows that 0.35 microseconds of ungarbled decode is sufficient for a valid decode. The problem is defining the exact amount of ungarbled decode necessary for valid decoding.

Analysis of the problem has shown that certain minimum times are necessary, and are the result of pulse position tolerances allowed within the overall system. The tolerances are presently ±0.1 microseconds for each pulse from its exact position, an integer multiple of 1.45 microseconds from the first framing pulse. Additionally, a pulse to pulse variation of no more than 0.15 microseconds is allowed. Therefore, when no garble is present, at least 0.15 microseconds of decode pulse width is needed to insure a valid and accurate decode. The presence of a single garble, either before or after the decode pulse, requires an additional 0.15 microseconds of time to insure that the information being decoded is from the proper pulse train, not the one causing the garble.

Figure 2:
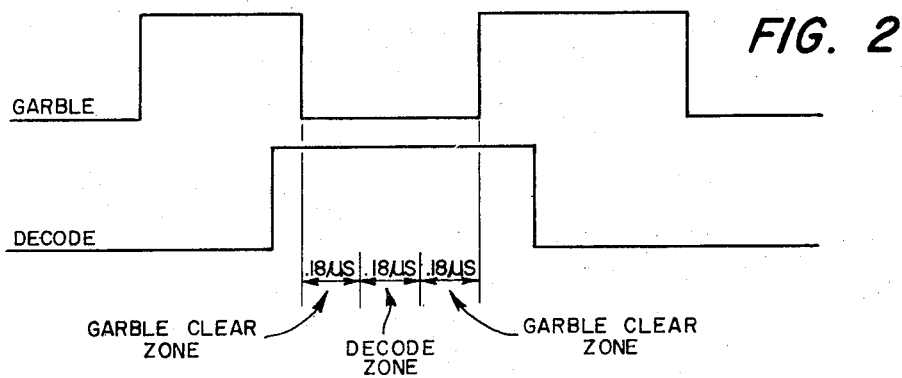
FIG. 2 illustrates the decoding criteria of the invention.

The analysis allowed the establishment of firm decoding criteria, which is diagrammed in FIG. 2. The criteria establish sub-zones, called the decode sub-zone and the garble clear subzone, within the normal decode pulse. Application of the decoding criteria at many successive points on the decode pulse, starting from the leading edge and continuing to the trailing edge, results in a final decode output which is adaptive to the timing differences between the normal decode and the output of the garble detection circuitry.

The bracket decode and garble outputs, from gates 14 and 49 respectively, are fed to individual shift register 16,17 groups which are clocked from the same source 20 used in the three main delay lines 11–13. As the bracket decode and garble detection outputs are shifted through their respective registers, AND gate 50 performs an examination to determine if the previously established decoding criteria have been met, i.e., a minimum width decode time sub-zone with a minimum garble clear sub-zone on each side of the bracket decode.

The circuitry of FIGS. 4a and 4b uses two periods of the shift register delay line clock as the time duration for both the decode and garble clear sub-zones. This time period, approximately 180 nanoseconds due to the 11.0344 MHz clock frequency, is close to the previously calculated minimums of 150 nanoseconds.

AND gate 50 has a total of six individual inputs, two for the decode sub-zone and four for the two garble clear sub-zones. The gate inputs for the garble clear sub-zones, coming from the garble register 16, are inhibiting type inputs. The output from AND gate 50 is inhibited if any one of the four lines has a signal present. The total elapsed time covered by the Garble Register 16 is equal to six clock periods. The time delay of the Bracket Register 17 is such that the two clock periods used for the decode sub-zone are in the middle of the six clock period duration of the garble register.

The output of AND gate 50 is effectively a degarbled-bracket decode which has been delayed by three clock periods from the ungarbled bracket decode from AND gate 14. The code information from the reply pulse train which caused the degarbled bracket decode has also been shifted in the Decoding Delay Line 12 three bits at the time of the degarbled bracket decode output from AND gate 50. Because the Decoding Delay Line 12 is tapped only in 16 bit increments, it is necessary to shift the code information by 13 more bits to place it at Decoding Delay Line 12 tap positions. The additional shift of 13 bits for the code information requires that the degarbled bracket decode also must be delayed by thirteen clock periods if the signal is to be used as a decoding gate.

The output of AND gate 50 is applied to the direct set inputs of the last two bits of the Delay Register 18. The Delay Register 18 itself is 15 bits in total length so that by placing the degarbled bracket decode into the last two bits of the register, the additional 13 clock period delay needed for complete decoding will be obtained.

The degarbled bracket decode output from the delay register is connected to one input of AND gates 61 through 73. The AND gates, 61 through 73, are connected to output taps of the Decoding Delay Line 12 and are enabled by the application of the degarbled bracket decode. Information pulses at delay line taps will be present at the output of their respective AND gates during the time of the degarbled bracket decode.

There are two primary advantages to the use of this decoding technique when it is compared to presently used techniques. The decoding efficiency, that is the percentage of the time during which a valid decode can be obtained under varying garble conditions, is substantially increased. Calculations have shown the improvement of efficiency to be two or more depending upon the data input parameters.

The decoding efficiency of this technique is constant regardless of input pulse widths, providing that the pulse widths of both the relay train being decoded and the garble pulse train are identical. This is the firs time a constant efficiency, independent of input pulse width, has been obtained.

The decoding technique described here allows for the proper and accurate decoding of two overlapped pulse trains even under conditions wherein the individual pulses comprising the two trains are combined so that the leading edges of the individual pulses are not present. Two normal-width pulses may be combined so as to form a single wide pulse without affecting the decoding accuracy or efficiency.

The apparatus disclosed above uses digital logic to perform its function. As such, the type of logic circuitry used is immaterial to the performance of the circuit. The use of 16 bits for each 1.45 microsecond time interval was arbitrary and made on the basis of easily obtainable components. The number of bits per 1.45 microsecond time increment could be increased with the requirement that the clock frequency also be increased so that the time delays in the Before Delay Line 11, the Decoding Delay Line 12, and the After DElay Line 13 remain at 20.3 microseconds. The clock frequency can then be increased to the point that two clock periods are greater than 150 nanoseconds without affecting any of the other logic functions.

An increase in the clock frequency so that two clock periods are less than 150 nanoseconds would require that the decode and garble-clear sub-zones occupy more than the two bits or clock periods shown in FIGS. 4a and 4b.

Obviously many modifications and variations of the present invention are possible in the light of the above teachings. It is therefore to be understood that within the scope of the appended claims the invention may be practiced otherwise than as described.

What is claimed and desired to be secured by Letters Patent of the United States is:

1. An IFF decoder-degarbler comprising:
   a transponder reply pulse train signal;
   means for detecting the framing pulses of said transponder signal comprising a plurality of equal delay lines, each of said delay lines comprising a plurality of shift registers, said delay lines having a plurality of output taps; and
   a source of clock pulses coupled to said delay lines for shifting said transponder signal through said delay lines;
   means for indicating the non-presence of a garble condition; and
   coincidence means coupled to said detecting and indicating means for permitting decoding of said transponder signal.

2. An IFF decoder-degarbler as recited in claim 1 wherein said detecting means comprises an AND gate coupled to the input and output of the second of said plurality of delay lines.

3. An IFF decoder-degarbler as recited in claim 2 wherein said gate indicating means further comprises an OR gate.

4. An IFF decoder-degarbler as recited in claim 3 further including a plurality of first AND gates, each of said first AND gates having their inputs coupled to taps on said delay lines separated by a time delay equal to that of a delay line, said first AND gate coupled to said OR gate.

5. An IFF decoder-degarbler as recited in claim 4 further including first register means coupled between said detecting means and said coincidence means; and
   second register means and NOT gates coupled between said OR gate and said coincidence means;
   whereby said first and second register means establish decoding criteria for said pulse train signal.

6. An IFF decoder-degarbler as recited in claim 5 further including second AND gates coupled to the output taps of said second delay lines; and
   a delay register coupled between said coincidence means and each of said second AND gates for synchronizing the coincidence means output with the output of said second delay line taps.

7. An IFF decoder-degarbler as recited in claim 6 wherein said plurality of delay lines comprise three delay lines of 20.3 microseconds and each of said delay lines have 15 output taps.

8. An IFF decoder-degarbler comprising:
   a transponder reply pulse train signal;
   equal delay means with gates coupled thereto for detecting the framing pulses of said transponder signal;
   means for indicating the non-presence of garble condition; and
   coincidence means coupled to said detecting and indicating means for permitting decoding of said transponder signal.

* * * * *